(12) United States Patent
Nakata et al.

(10) Patent No.: US 10,670,118 B2
(45) Date of Patent: Jun. 2, 2020

(54) TENSIONER

(71) Applicant: TSUBAKIMOTO CHAIN CO., Osaka-shi, Osaka (JP)

(72) Inventors: Yohei Nakata, Osaka (JP); Yuji Kurematsu, Osaka (JP); Toshitaka Ogo, Osaka (JP)

(73) Assignee: TSUBAKIMOTO CHAIN CO., Osaka (JP)

( * ) Notice: Subject to any disclaimer, the term of this patent is extended or adjusted under 35 U.S.C. 154(b) by 333 days.

(21) Appl. No.: 15/798,987

(22) Filed: Oct. 31, 2017

(65) Prior Publication Data

US 2018/0128355 A1 May 10, 2018

(30) Foreign Application Priority Data

Nov. 7, 2016 (JP) ................................ 2016-216932

(51) Int. Cl.
*F16H 7/08* (2006.01)

(52) U.S. Cl.
CPC ... *F16H 7/0848* (2013.01); *F16H 2007/0814* (2013.01); *F16H 2007/0853* (2013.01); *F16H 2007/0859* (2013.01)

(58) Field of Classification Search
CPC ........... F16H 7/0848; F16H 2007/0853; F16H 2007/0855; F16H 2007/0859; F16H 2007/0814; F16H 2007/0812
See application file for complete search history.

(56) References Cited

U.S. PATENT DOCUMENTS

| 5,087,225 | A | * | 2/1992 | Futami | F16H 7/08 474/110 |
| 5,304,099 | A | * | 4/1994 | Deppe | F16H 7/0848 474/110 |
| 5,707,309 | A | * | 1/1998 | Simpson | F16H 7/08 474/110 |
| 6,383,103 | B1 | * | 5/2002 | Fujimoto | F01L 1/02 474/109 |
| 6,398,682 | B1 | * | 6/2002 | Suzuki | F16H 7/08 474/110 |
| 2001/0006917 | A1 | * | 7/2001 | Hashimoto | F01L 1/024 474/110 |
| 2001/0007840 | A1 | * | 7/2001 | Nakakubo | F16H 7/0836 474/110 |

(Continued)

FOREIGN PATENT DOCUMENTS

JP 2001-12569 A 1/2001
JP 2002-327810 A 11/2002

*Primary Examiner* — Michael R Mansen
*Assistant Examiner* — Raveen J Dias
(74) *Attorney, Agent, or Firm* — Westerman, Hattori, Daniels & Adrian, LLC (57) ABSTRACT

A tensioner with a simple structure is provided, which is capable of keeping oil pressure in a first high oil-pressure chamber stable and holding a chain favorably. The tensioner includes a plunger, a housing, a check valve, an inner sleeve, and a biasing member. In the housing, a second high oil-pressure chamber and a unit setting part are formed. In the unit setting part, a relief valve unit is set. A gap between an inner circumferential surface of a plunger hole and an outer circumferential surface of the inner sleeve functions as part of an oil flow passage that connects the first high oil-pressure chamber and the second high oil-pressure chamber.

6 Claims, 9 Drawing Sheets

(56) References Cited

U.S. PATENT DOCUMENTS

| | | | |
|---|---|---|---|
| 2002/0169042 A1 | 11/2002 | Kurohata et al. | |
| 2007/0287562 A1* | 12/2007 | Assel | F16H 7/0848 |
| | | | 474/110 |
| 2009/0197721 A1* | 8/2009 | Emizu | F16H 7/0836 |
| | | | 474/110 |
| 2011/0256970 A1* | 10/2011 | Nakano | F16H 7/0836 |
| | | | 474/110 |
| 2012/0252616 A1* | 10/2012 | Tawarada | F16H 7/0848 |
| | | | 474/110 |
| 2013/0288836 A1* | 10/2013 | Kurematsu | F16H 7/0836 |
| | | | 474/110 |
| 2014/0200104 A1* | 7/2014 | Kurematsu | F16H 7/08 |
| | | | 474/110 |
| 2015/0240918 A1* | 8/2015 | Emizu | F01L 1/024 |
| | | | 474/110 |
| 2016/0084359 A1* | 3/2016 | Wigsten | F16H 7/0836 |
| | | | 474/110 |
| 2017/0138444 A1* | 5/2017 | Kurematsu | F16H 7/0848 |
| 2018/0180191 A1* | 6/2018 | Shinoyama | F16H 7/08 |
| 2018/0363740 A1* | 12/2018 | Kimura | F16H 7/08 |
| 2019/0170224 A1* | 6/2019 | Fuhrmann | F16H 7/08 |
| 2019/0234494 A1* | 8/2019 | Cobb | F16H 7/0836 |

* cited by examiner

RELATED ART

Fig. 7

RELATED ART

Fig. 8

RELATED ART

TENSIONER

BACKGROUND OF THE INVENTION

1. Field of the Invention

The present invention relates to a tensioner that applies appropriate tension to a running chain, belt, or the like.

2. Description of the Related Art

It has been common practice to use a tensioner for maintaining appropriate tension in a chain or the like. For example, a known chain guide mechanism uses a tensioner to bias a tensioner lever for slidably guiding a drive chain, such as an endless roller chain passing over respective sprockets of a crankshaft and a cam shaft inside an engine room, to maintain appropriate tension of the chain or the like.

Figure 6:
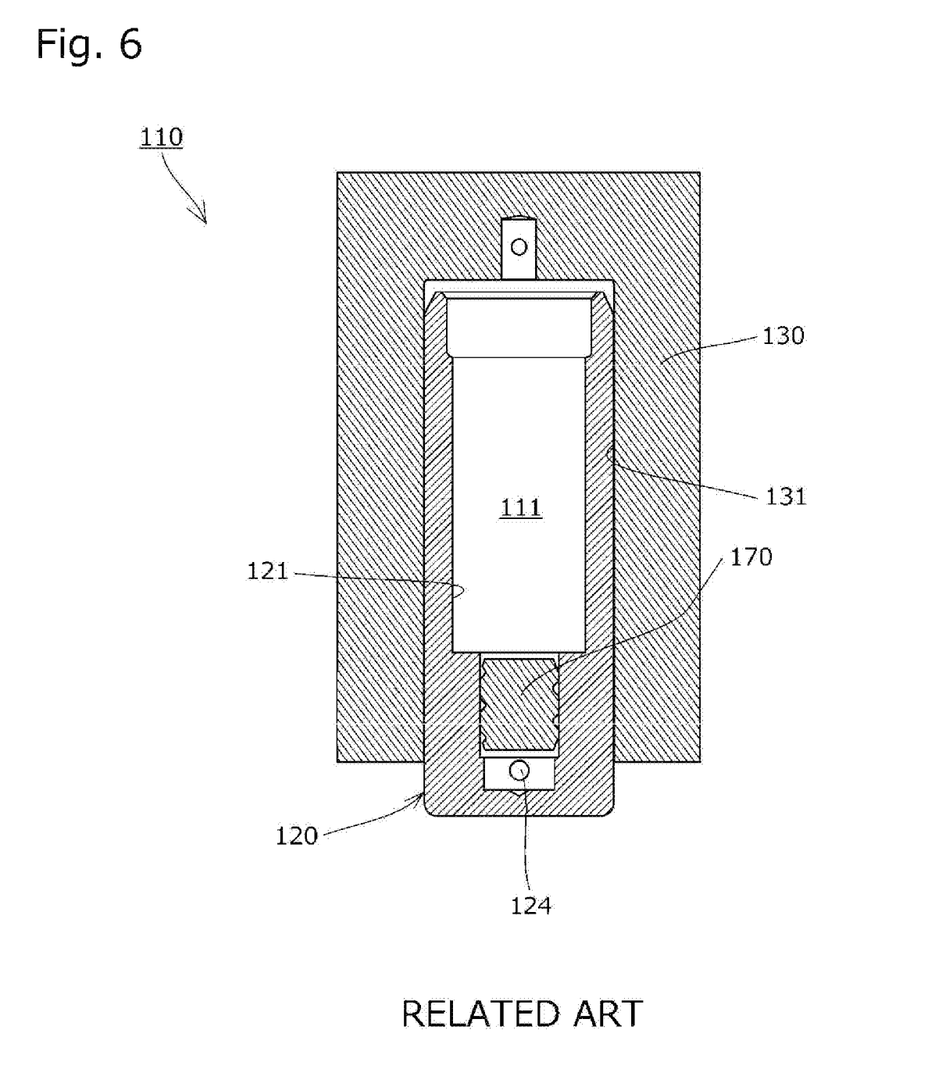
FIG. 6 is a cross-sectional view illustrating a conventional tensioner.

The known tensioner 110 includes, as shown in FIG. 6, a housing 130 having a plunger accommodation bore 131 open on a front side, a plunger 120 slidably inserted in the plunger accommodation bore 131, and a coil spring (not shown in FIG. 6) that biases the plunger 120 toward the front side. In such a tensioner 110, oil is supplied to a high oil-pressure chamber 111 formed between the plunger accommodation bore 131 and the plunger 120, so that the plunger 120 is biased toward the front side by the oil in the high oil-pressure chamber 111. As the plunger 120 reciprocates, oil flows through the small gap between the plunger 120 and the plunger accommodation bore 131, and the flow resistance provides the damping effect of slowing down the reciprocal movement of the plunger 120.

It has been known to provide a mechanism for discharging the oil inside the high oil-pressure chamber 111 to the outside of the plunger 120 when the oil pressure in the high oil-pressure chamber 111 builds up, so as to maintain the oil pressure in the high oil-pressure chamber 111 at an appropriate level. In one form of such a mechanism, as shown in FIG. 6, it is known to provide a relief hole 124 in the plunger 120 to connect the inside and outside of the plunger 120, and to dispose an orifice member 170 inside the plunger 120.

A helical groove is formed in an outer circumferential surface of the orifice member 170. The orifice member 170 is press-fit into the plunger hole 121, and the gap between the inner circumferential surface of the plunger hole 121 and the groove of the orifice member 170 is used to adjust the amount of oil to be discharged from the relief hole 124.

SUMMARY OF THE INVENTION

However, when the tensioner 110 with such an orifice member 170 set on the front end of the plunger 120 is disposed such that the front end of the plunger 120 is oriented vertically downward as shown in FIG. 6, oil in the high oil-pressure chamber 111 (plunger hole 121) could leak from the relief hole 124 when the engine is at a standstill. If this is the case, when the engine is re-started, no hydraulic pressure acts until oil is supplied into the high oil-pressure chamber 111, so that the chain cannot be held favorably by the plunger 120 and noise may be generated.

With the tensioner 110 having the orifice member 170 set at the front end of the plunger 120, when the plunger 120 is pushed back hard to the rear side by the chain, the pressure in the high oil-pressure chamber 111 becomes extremely high and does not allow the plunger 120 to move back to the rear side. As a result, the chain is kept tense. If oil is let out more easily so as to avoid this issue, the plunger 120 will be pushed back rearward even with a slight force, which leads to the problem of chain flapping.

Figure 7:
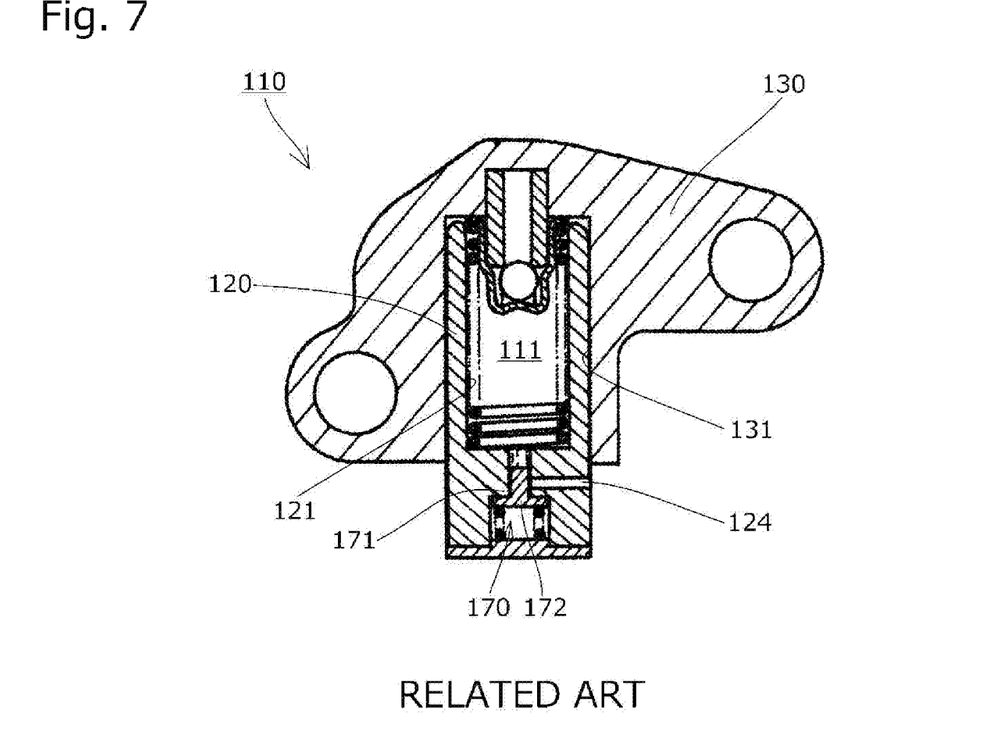
FIG. 7 is a cross-sectional view illustrating another conventional tensioner.

Another design is also known, wherein a relief valve mechanism 170 is set at the front end of the plunger 120 as shown in FIG. 7 instead of the orifice member 170 mentioned above (see, for example, Japanese Patent Application Laid-open No. 2001-12569). This relief valve mechanism 170 includes a valve member 172 that can sit on a seat part 171 in tight contact therewith, and is configured to move the valve member 172 with oil pressure when the oil pressure inside the high oil-pressure chamber 111 rises so as to release the oil inside the high oil-pressure chamber 111 to the outside.

Even with the use of such a relief valve mechanism 170, there is still an issue that the chain may not be held favorably when the plunger 120 is pushed back hard to the rear side by the chain because the oil inside the high oil-pressure chamber 111 is discharged to the outside of the plunger 120 by the relief valve mechanism 170 and after that there is temporarily no oil inside the high oil-pressure chamber.

Figure 8:
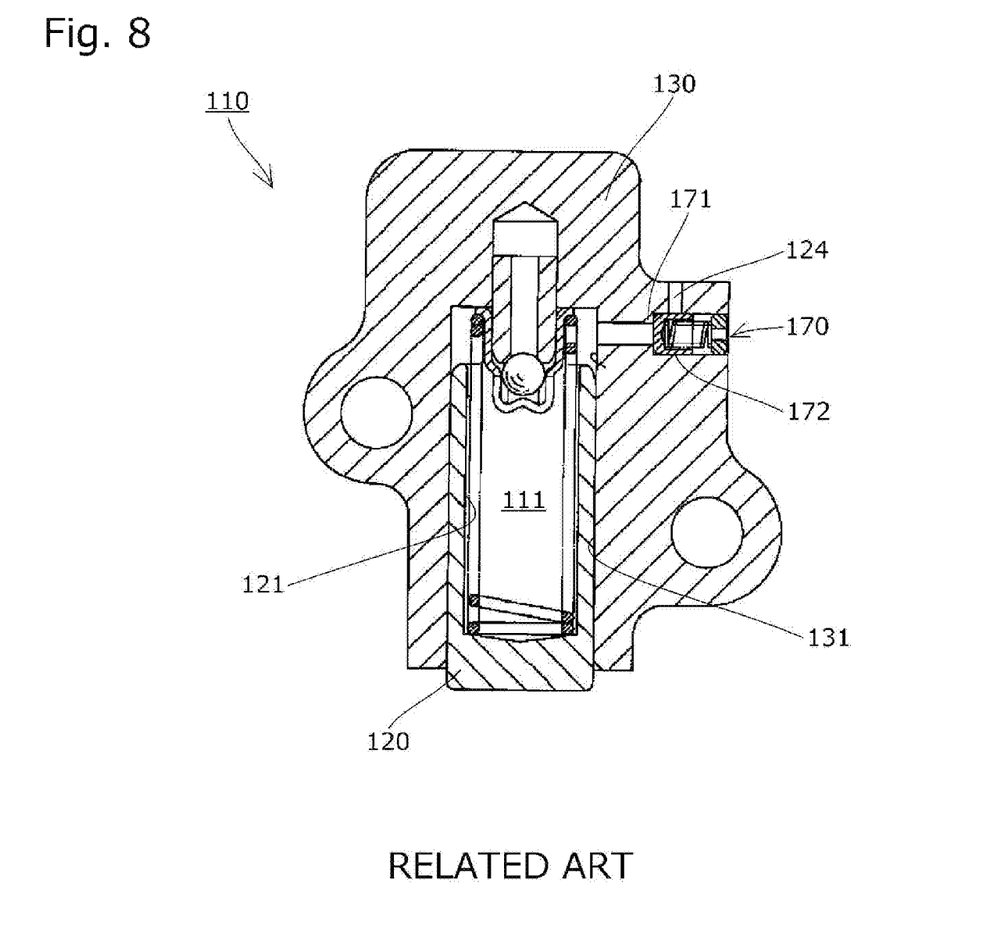
FIG. 8 is a cross-sectional view illustrating yet another conventional tensioner.

Yet another design that can be considered is to set the relief valve mechanism 170 described above or the like somewhere else other than the front end of the plunger 120 as shown in FIG. 8 (see, for example, Japanese Patent Application Laid-open No. 2002-327810). In the example shown in FIG. 8, oil leakage from the high oil-pressure chamber 111 (plunger hole 121) to the outside of the plunger 120 when the engine is at a standstill can be prevented even when the plunger 120 is oriented such that its front end is vertically downward.

However, even this example shown in FIG. 8 cannot solve the problem that there will be temporarily no oil inside the high oil-pressure chamber after the oil inside the high oil-pressure chamber 111 has been discharged to the outside of the plunger 120 by the relief valve mechanism 170 when the plunger 120 is pushed back hard to the rear side by the chain.

The present invention solves these problems and it is an object of the invention to provide a tensioner that can keep the oil pressure inside a first high oil-pressure chamber stable to hold the chain favorably with a simple structure.

The present invention solves the problems described above by providing a tensioner including: a plunger having a plunger hole that is open on a rear side; a housing having a plunger accommodation bore that is open on a front side and accommodates the plunger; a check valve disposed inside the plunger hole and partitioning an internal space formed between the housing and the plunger into a first high oil-pressure chamber on the front side and an oil reservoir chamber on the rear side; an inner sleeve disposed inside the oil reservoir chamber; and a biasing member disposed inside the first high oil-pressure chamber and biasing the plunger toward the front side. The housing includes a second high oil-pressure chamber communicating with the plunger accommodation bore, and a unit setting part communicating with the second high oil-pressure chamber and with outside of the housing. A relief unit that releases oil inside the second high oil-pressure chamber to the outside when oil pressure inside the second high oil-pressure chamber rises is set in the unit setting part. A gap between an inner circumferential surface of the plunger hole and an outer circumferential surface of the inner sleeve functions as part of an oil flow passage that connects the first high oil-pressure chamber and the second high oil-pressure chamber.

According to one aspect of the present invention, a second high oil-pressure chamber is formed in the housing in addition to the first high oil-pressure chamber, and a relief unit is provided outside the second high oil-pressure chamber. When the plunger is pushed back hard to the rear side by the chain and the oil pressure inside the first high oil-pressure chamber rises, oil inside the second high oil-pressure chamber connected to the first high oil-pressure chamber can be discharged from the relief unit. Therefore, unlike the case where the relief unit is provided at the front end of the plunger, oil leakage from the first high oil-pressure chamber to the outside of the plunger when the engine is at a standstill can be prevented even when the plunger is oriented such that its front end is vertically downward.

The gap between the inner circumferential surface of the plunger hole and the outer circumferential surface of the inner sleeve is utilized as part of the oil flow passage connecting the first high oil-pressure chamber and the second high oil-pressure chamber. Since such a gap is easily formed to be sufficiently thin and long, the oil flow passage that provides sufficient flow resistance can be formed with a simple structure without the need to perform complex machining on the housing and others. Accordingly, even when the plunger is pushed back hard to the rear side by the chain, pressure can be released from the first high oil-pressure chamber to the second high oil-pressure chamber, so that, while an excessive buildup of oil pressure in the first high oil-pressure chamber is prevented, release of a large amount of oil from the first high oil-pressure chamber is avoided. Thus a sufficient amount of oil can remain in the first high oil-pressure chamber and the oil pressure in the first high oil-pressure chamber is kept stable.

According to another aspect of the present invention, an oil groove is formed in an outer circumferential surface of an inserted component inserted into the plunger hole, and the gap between the inner circumferential surface of the plunger hole and the oil groove functions as part of an oil flow passage, so that oil can flow from the first high oil-pressure chamber to the second high oil-pressure chamber radially outside the check valve (inserted component) while avoiding reverse flow of the oil from the first high oil-pressure chamber to the oil reservoir chamber by the check valve.

According to another aspect of the present invention, the circumferential position of the second high oil-pressure chamber is matched with the circumferential position of the oil groove, so that the pressure inside the first high oil-pressure chamber can be released smoothly to the second high oil-pressure chamber. Also, since a ratchet meshing with the plunger stops the plunger from rotating, the second high oil-pressure chamber and the oil groove are stopped from displacing out of position relative to each other.

According to another aspect of the present invention, at a rear end of the inner sleeve, a rear end communication groove that connects inside and outside of the inner sleeve is formed so that part of the oil flowing from the first high oil-pressure chamber to the second high oil-pressure chamber, and part of the oil being discharged to the outside from the second high oil-pressure chamber, can be collected to the oil reservoir chamber through the rear end communication groove, and that oil can be supplied directly from the oil reservoir chamber to the second high oil-pressure chamber through the rear end communication groove and not via the first high oil-pressure chamber.

According to another aspect of the present invention, at a front end of the inner sleeve, a front end communication groove that connects inside and outside of the inner sleeve is formed so that part of the oil flowing from the first high oil-pressure chamber to the second high oil-pressure chamber can be collected to the oil reservoir chamber through the front end communication groove.

DESCRIPTION OF THE PREFERRED EMBODIMENT

A tensioner 10 according to one embodiment of the present invention will be described with reference to the drawings.

First, the tensioner 10 is incorporated in a chain drive device used in a timing system or the like of a car engine. The tensioner is attached to an engine block to apply appropriate tension to the slack side of a drive chain passing over a plurality of sprockets via a tensioner lever to reduce vibration during the drive.

Figure 1:
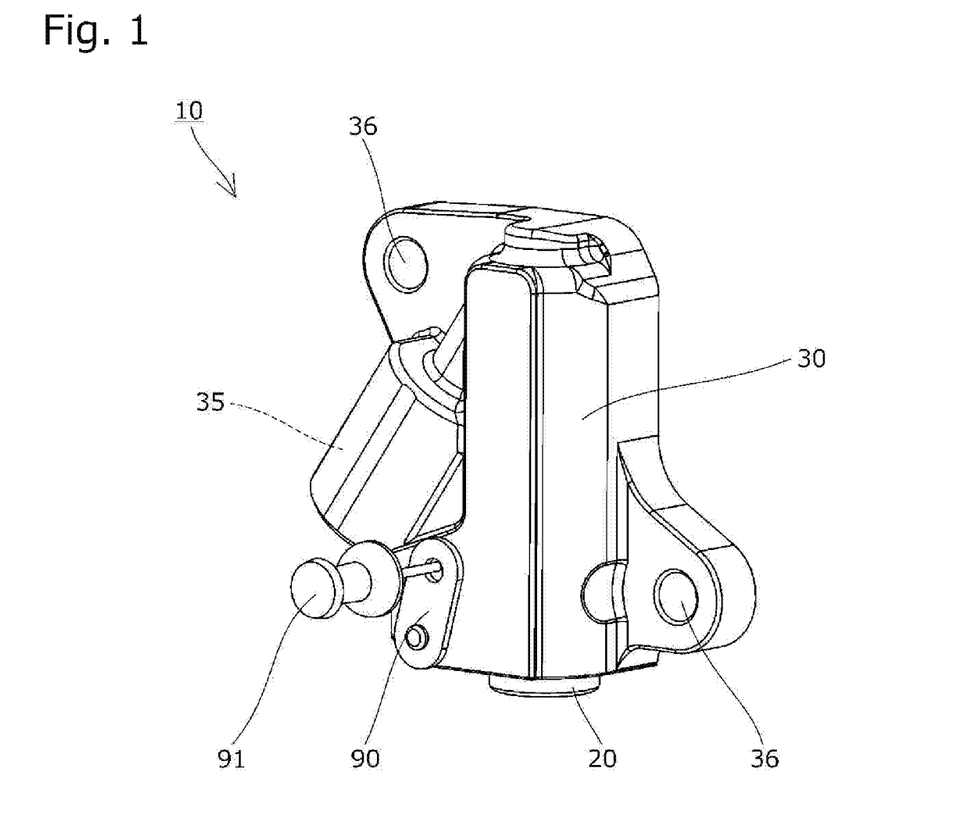
FIG. 1 is a perspective view illustrating a tensioner according to one embodiment of the present invention.
Figure 2:
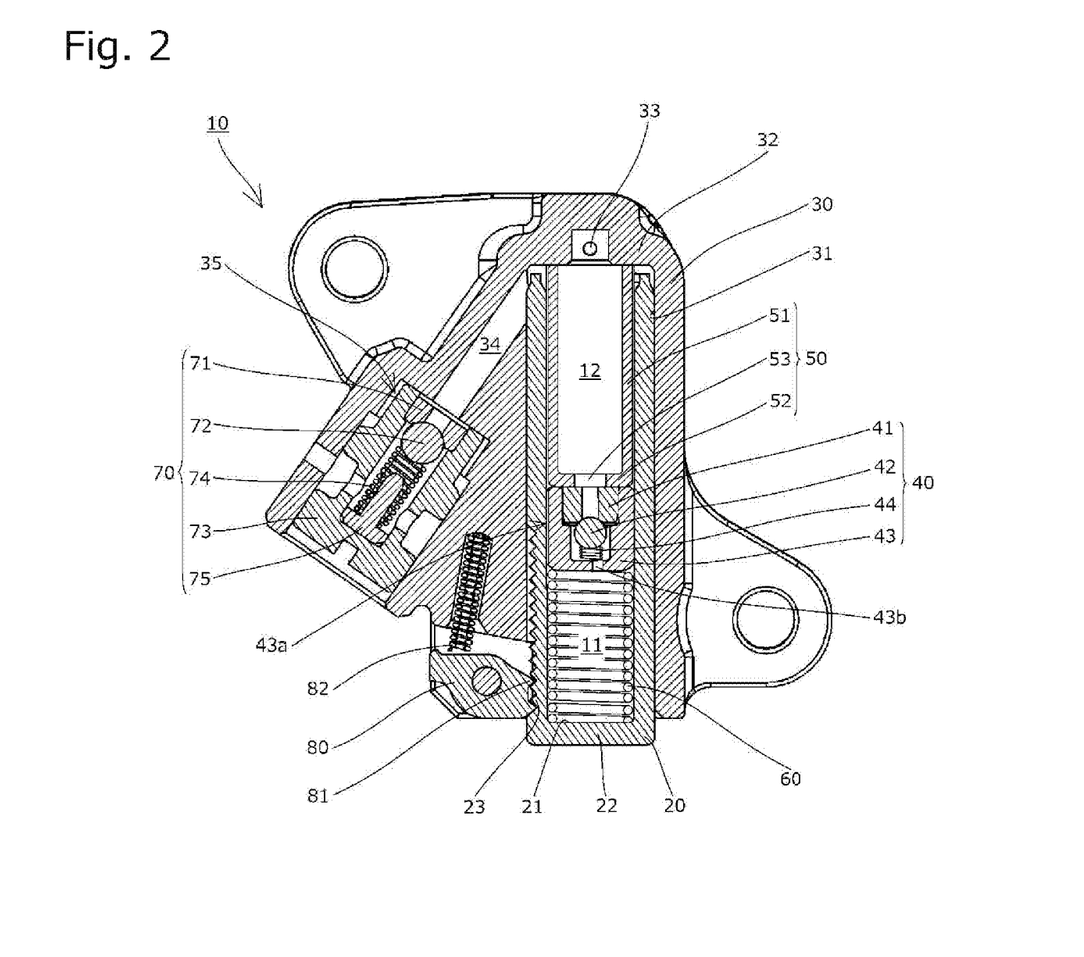
FIG. 2 is a cross-sectional view illustrating the tensioner.

The tensioner 10 includes, as shown in FIG. 1 and FIG. 2, a cylindrical plunger 20, a housing 30 having a plunger accommodation bore 31 that is open on a front side and accommodates the plunger 20, a check valve 40 arranged inside the plunger accommodation bore 31 and partitioning an internal space formed between the housing 30 and the plunger 20 into a first high oil-pressure chamber 11 on the front side and an oil reservoir chamber 12 on the rear side, an inner sleeve 50 slidably disposed inside the oil reservoir chamber 12, a coil spring 60 as a biasing member arranged inside the first high oil-pressure chamber 11 to bias the plunger 20 to the front side, a relief valve unit 70 set in a unit setting part 35 of the housing 30 as will be described later, a ratchet 80 pivotally attached to the housing 30, and a stopper lever 90 and stopper pin 91 used for temporarily stopping the plunger 20 from protruding.

The plunger 20 includes a plunger hole 21 open on the rear side, a plunger bottom 22 formed at the rear end, and rack teeth 23 formed on an outer circumferential surface of the plunger and meshing with the ratchet 80, as shown in FIG. 2.

The housing 30 includes, as shown in FIG. 1 and FIG. 2, the cylindrical plunger accommodation bore 31, a housing bottom 32 formed on the rear side, a housing oil supply hole 33 formed in the housing bottom 32 for supplying oil from outside into the oil reservoir chamber 12, a second high oil-pressure chamber 34 open to and communicating with the plunger accommodation bore 31 at the rear end of the plunger accommodation bore 31, the unit setting part 35 open to and communicating with the second high oil-pressure chamber 34 and with the outside of the housing 30, and attachment holes 36 for attachment to the engine block.

The second high oil-pressure chamber 34 (and unit setting part 35) are formed such as to extend in a direction at an angle of 90° or less (about 40° in this embodiment) relative to the advancing and retracting direction (front to back direction) of the plunger 20 as shown in FIG. 2.

The check valve 40 allows oil to flow from the oil reservoir chamber 12 into the first high oil-pressure chamber 11, and stops reverse flow of the oil from the first high oil-pressure chamber 11 into the oil reservoir chamber 12. As shown in FIG. 2, the check valve 40 includes a seat member 41 having a through hole in the center, a spherical valve member 42 capable of sitting on a front end portion of the seat member 41 in tight contact therewith, a retainer 43 restricting movement of the valve member 42, and a spring 44 arranged between the valve member 42 and the retainer 43 and biasing the valve member 42 toward the rear side (toward the seat member 41). The spring 44 is not an essential constituent element and may not be provided depending on the embodiment.

Figure 4:
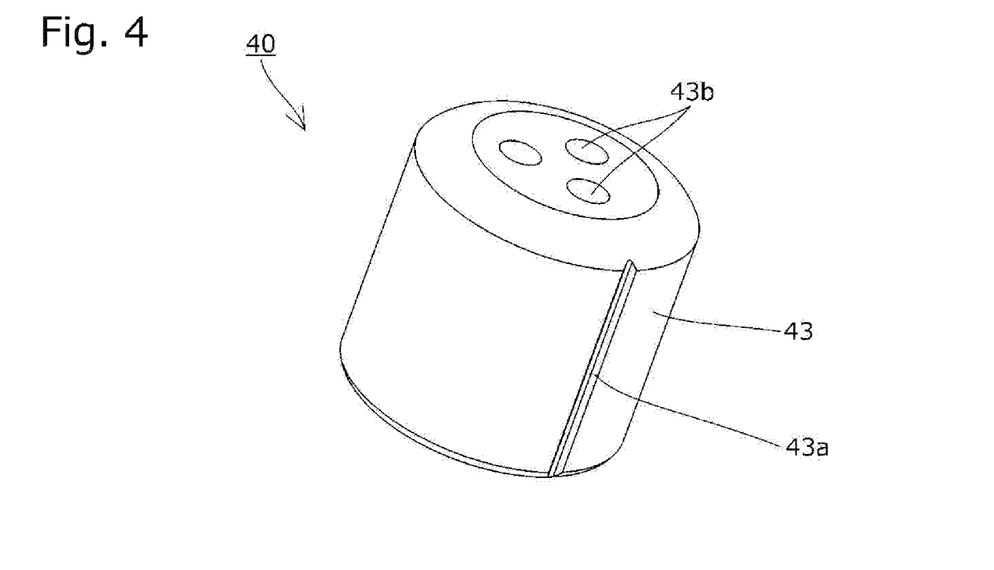
FIG. 4 is a perspective view illustrating a check valve.

The retainer 43 is configured as an inserted component inserted into the plunger hole 21 as shown in FIG. 2. An oil groove 43a extending in the front to back direction is formed in an outer circumferential surface of the retainer 43 as shown in FIG. 4, and through holes 43b are formed in the bottom of the retainer 43 to extend through in the front to back direction.

The check valve 40 is set inside the plunger hole 21 such that the circumferential position of the second high oil-pressure chamber 34 matches that of the oil groove 43a in the circumferential direction of the plunger 20 as shown in FIG. 2.

Figure 5A:
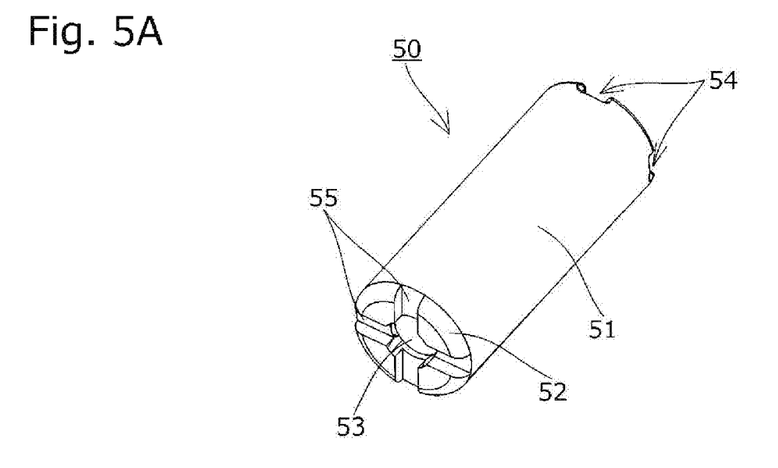
FIG. 5A is a perspective view illustrating an inner sleeve.
Figure 5B:
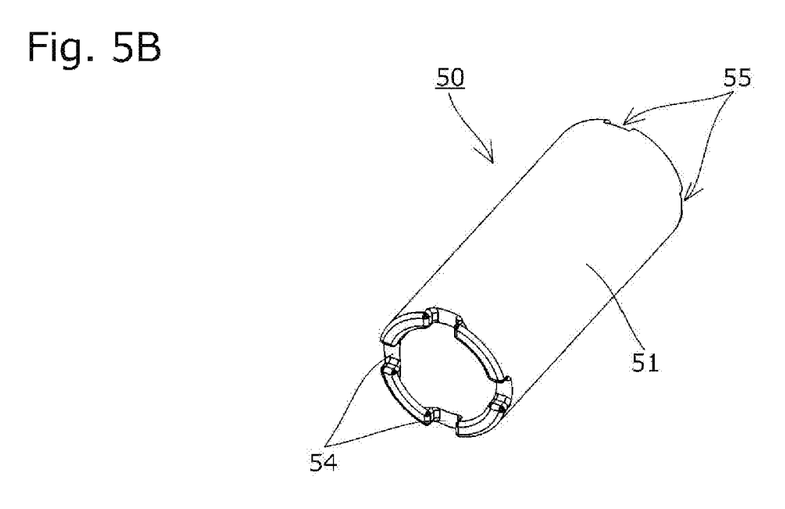
FIG. 5B is a perspective view illustrating the inner sleeve.

The inner sleeve 50 is made of metal such as iron and includes, as shown in FIG. 2, FIG. 5A, and FIG. 5B, a cylindrical tubular main body 51 whose interior functions as the oil reservoir chamber 12, a sleeve bottom 52 formed at the front end of the tubular main body 51, an oil hole 53 formed in the sleeve bottom 52, rear end communication grooves 54 formed at four locations in total at the rear end of the inner sleeve 50 for connecting inside and outside of the inner sleeve 50, and front end communication grooves 55 formed at four locations in total in the sleeve bottom 52 (front end of the inner sleeve 50) for connecting inside and outside of the inner sleeve 50.

The inner sleeve 50 is set inside the plunger hole 21, with the sleeve bottom 52 oriented toward the front side, as shown in FIG. 2. The inner sleeve 50 is biased toward the rear side by the coil spring 60 arranged between the plunger bottom 22 and the sleeve bottom 52, so that the rear end of the tubular main body 51 is in contact with the front face of the housing bottom 32.

The coil spring 60 is accommodated in the first high oil-pressure chamber 11 as shown in FIG. 2, more specifically between the rear face of the plunger bottom 22 and the front face of the sleeve bottom 52, such as to be able to expand and contract.

The relief valve unit 70 releases oil inside the second high oil-pressure chamber 34 to the outside when the oil pressure inside the second high oil-pressure chamber 34 rises. As shown in FIG. 2, the relief valve unit includes a seat member 71 having a through hole in the center, a spherical valve member 72 capable of sitting on the seat member 71 in tight contact therewith, a retainer 73 restricting movement of the valve member 72, a spring 74 arranged between the valve member 72 and the retainer 73 and biasing the valve member 72 toward the seat member 71, and a spring support member 75 attached to the retainer 73 and supporting the spring 74. The spring 74 and spring support member 75 are not essential constituent elements and may not be provided depending on the embodiment.

As shown in FIG. 2, the ratchet 80 is configured to include a ratchet pawl 81 capable of meshing with the rack teeth 23 of the plunger 20. The ratchet pawl 81 is biased with a biasing spring 82 so that the ratchet pawl meshes with the rack teeth 23 and restricts the movement of the plunger 20 toward the rear side. The ratchet 80 functions also as an anti-rotation member for restricting rotation of the plunger 20 relative to the housing 30 by engagement of the ratchet pawl 81 with the rack teeth 23.

The tensioner 10 of this embodiment thus obtained has the second high oil-pressure chamber 34 formed in the housing 30 in addition to the first high oil-pressure chamber 11, with the relief valve unit 70 provided outside the second high oil-pressure chamber 34. When the plunger 20 is pushed back hard to the rear side by the chain and the oil pressure inside the first high oil-pressure chamber 11 rises, oil inside the second high oil-pressure chamber 34 connected to the first high oil-pressure chamber 11 is discharged from the relief valve unit 70.

This way, unlike the case where the relief valve unit 70 is provided at the front end of the plunger 20, oil leakage from the first high oil-pressure chamber 11 to the outside of the plunger 20 when the engine is at a standstill can be prevented even when the plunger 20 is oriented such that its front end is vertically downward.

Figure 3:
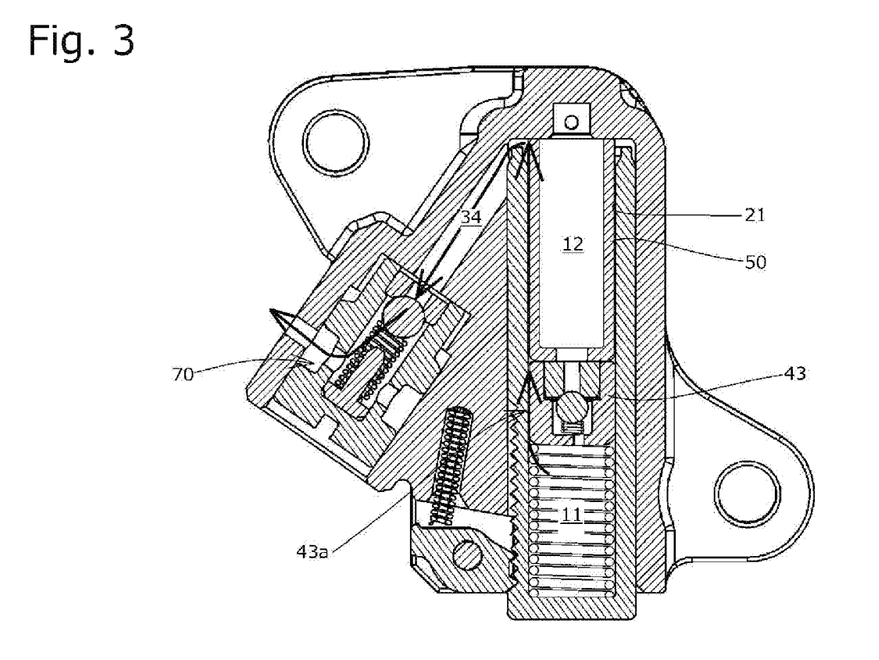
FIG. 3 is an illustrative diagram schematically showing the flow of oil when the plunger is pushed back hard to the rear side by the chain.

A gap between the inner circumferential surface of the plunger hole 21 and the outer circumferential surface of the inner sleeve 50 is utilized as part of the oil flow passage connecting the first high oil-pressure chamber 11 and the second high oil-pressure chamber 34 as shown in FIG. 3. Since such a gap is easily formed to be sufficiently thin and long, the oil flow passage that provides sufficient flow resistance can be formed with a simple structure without the need to perform complex machining on the housing 30 and others.

Accordingly, even when the plunger 20 is pushed back hard to the rear side by the chain, pressure can be released from the first high oil-pressure chamber 11 to the second high oil-pressure chamber 34, so that, while an excessive buildup of oil pressure in the first high oil-pressure chamber 11 is prevented, release of a large amount of oil from the first high oil-pressure chamber 11 is avoided. Thus a sufficient amount of oil can remain in the first high oil-pressure chamber 11 and the oil pressure in the first high oil-pressure chamber 11 is kept stable.

While one embodiment of the present invention has been described in detail, the present invention is not limited to the above-described embodiment and may be carried out with various design changes without departing from the scope of the present invention set forth in the claims.

For example, various configurations of the embodiment described above may be freely combined to form other tensioners.

While the tensioner was described as a component to be incorporated in a timing system of a car engine in the embodiment above, the purpose of use of the tensioner is not limited to this specific application.

Also, while the tensioner was described as a component that applies tension to a drive chain with a tensioner lever in the embodiment above, the plunger can directly guide the drive chain slidably with a distal end thereof to apply tension to the drive chain.

The tensioner may not necessarily be applied to a transmission mechanism with a drive chain but can also be used for similar transmission mechanisms that use belts, ropes and the like, and can be applied in a variety of industrial fields where it is required to apply tension to an elongated component.

While the housing accommodating the plunger is described as the component known as a housing that is attached to an engine block or the like in the embodiment described above, the housing is not limited to the specific form described above and may be a cylindrical component known as a sleeve inserted into a body hole formed in the housing.

While the retainer that restricts movement of the valve member of the check valve is an inserted component inserted into the plunger hole in the embodiment described above, the inserted component need not necessarily be in this specific form. For example, a seat member for a valve member to sit on may be configured as an inserted component.

While the relief unit that releases oil in the second high oil-pressure chamber to the outside is configured as a relief valve unit that includes a valve member in the embodiment described above, the relief unit may have any specific forms as long as it releases oil in the second high oil-pressure chamber to the outside when the oil pressure in the second high oil-pressure chamber rises. For example, the relief unit may be configured with an orifice shown in FIG. 6.

What is claimed is:

1. A tensioner comprising: a plunger having a plunger hole that is open on a rear side; a housing having a plunger accommodation bore that is open on a front side and accommodates the plunger; a check valve disposed inside the plunger hole and partitioning an internal space formed between the housing and the plunger into a first high oil-pressure chamber on the front side and an oil reservoir chamber on the rear side; an inner sleeve disposed inside the oil reservoir chamber; and a biasing member disposed inside the first high oil-pressure chamber and biasing the plunger toward the front side,
   the housing including a second high oil-pressure chamber communicating with the plunger accommodation bore, and a unit setting part communicating with the second high oil-pressure chamber and with outside of the housing,
   a relief unit that releases oil inside the second high oil-pressure chamber to the outside, when oil pressure inside the second high oil-pressure chamber rises, being set in the unit setting part,
   a gap between an inner circumferential surface of the plunger hole and an outer circumferential surface of the inner sleeve functioning as part of an oil flow passage that connects the first high oil-pressure chamber and the second high oil-pressure chamber,
   the check valve including an inserted component inserted into the plunger hole, and
   an oil groove being formed in an outer circumferential surface of the inserted component.

2. The tensioner according to claim 1, further comprising a ratchet pivotally supported in the housing and engaging with the plunger, wherein
   the check valve is set inside the plunger hole such that a circumferential position of the second high oil-pressure chamber and a circumferential position of the oil groove match each other in a circumferential direction of the plunger.

3. The tensioner according to claim 1, wherein at a rear end of the inner sleeve, a rear end communication groove that connects inner circumference and outer circumference of the inner sleeve is formed.

4. The tensioner according to claim 1, wherein at a front end of the inner sleeve, a front end communication groove that connects inner circumference and outer circumference of the inner sleeve is formed.

5. A tensioner comprising: a plunger having a plunger hole that is open on a rear side; a housing having a plunger accommodation bore that is open on a front side and accommodates the plunger; a check valve disposed inside the plunger hole and partitioning an internal space formed between the housing and the plunger into a first high oil-pressure chamber on the front side and an oil reservoir chamber on the rear side; an inner sleeve disposed inside the oil reservoir chamber; and a biasing member disposed inside the first high oil-pressure chamber and biasing the plunger toward the front side,
   the housing including a second high oil-pressure chamber communicating with the plunger accommodation bore, and a unit setting part communicating with the second high oil-pressure chamber and with outside of the housing,
   a relief unit that releases oil inside the second high oil-pressure chamber to the outside, when oil pressure inside the second high oil-pressure chamber rises, being set in the unit setting part,
   a gap between an inner circumferential surface of the plunger hole and an outer circumferential surface of the inner sleeve functioning as part of an oil flow passage that connects the first high oil-pressure chamber and the second high oil-pressure chamber, and
   at a rear end of the inner sleeve, a rear end communication groove that connects inner circumference and outer circumference of the inner sleeve is formed.

6. A tensioner comprising: a plunger having a plunger hole that is open on a rear side; a housing having a plunger accommodation bore that is open on a front side and accommodates the plunger; a check valve disposed inside the plunger hole and partitioning an internal space formed between the housing and the plunger into a first high oil-pressure chamber on the front side and an oil reservoir chamber on the rear side; an inner sleeve disposed inside the oil reservoir chamber; and a biasing member disposed inside the first high oil-pressure chamber and biasing the plunger toward the front side,
   the housing including a second high oil-pressure chamber communicating with the plunger accommodation bore, and a unit setting part communicating with the second high oil-pressure chamber and with outside of the housing,
   a relief unit that releases oil inside the second high oil-pressure chamber to the outside, when oil pressure inside the second high oil-pressure chamber rises, being set in the unit setting part,
   a gap between an inner circumferential surface of the plunger hole and an outer circumferential surface of the inner sleeve functioning as part of an oil flow passage that connects the first high oil-pressure chamber and the second high oil-pressure chamber, and
   at a front end of the inner sleeve, a front end communication groove that connects inner circumference and outer circumference of the inner sleeve is formed.

* * * * *